Aug. 21, 1934.       D. G. TAYLOR       1,970,988
TEMPERATURE CONTROL SYSTEM
Original Filed Jan. 10, 1931   2 Sheets-Sheet 2

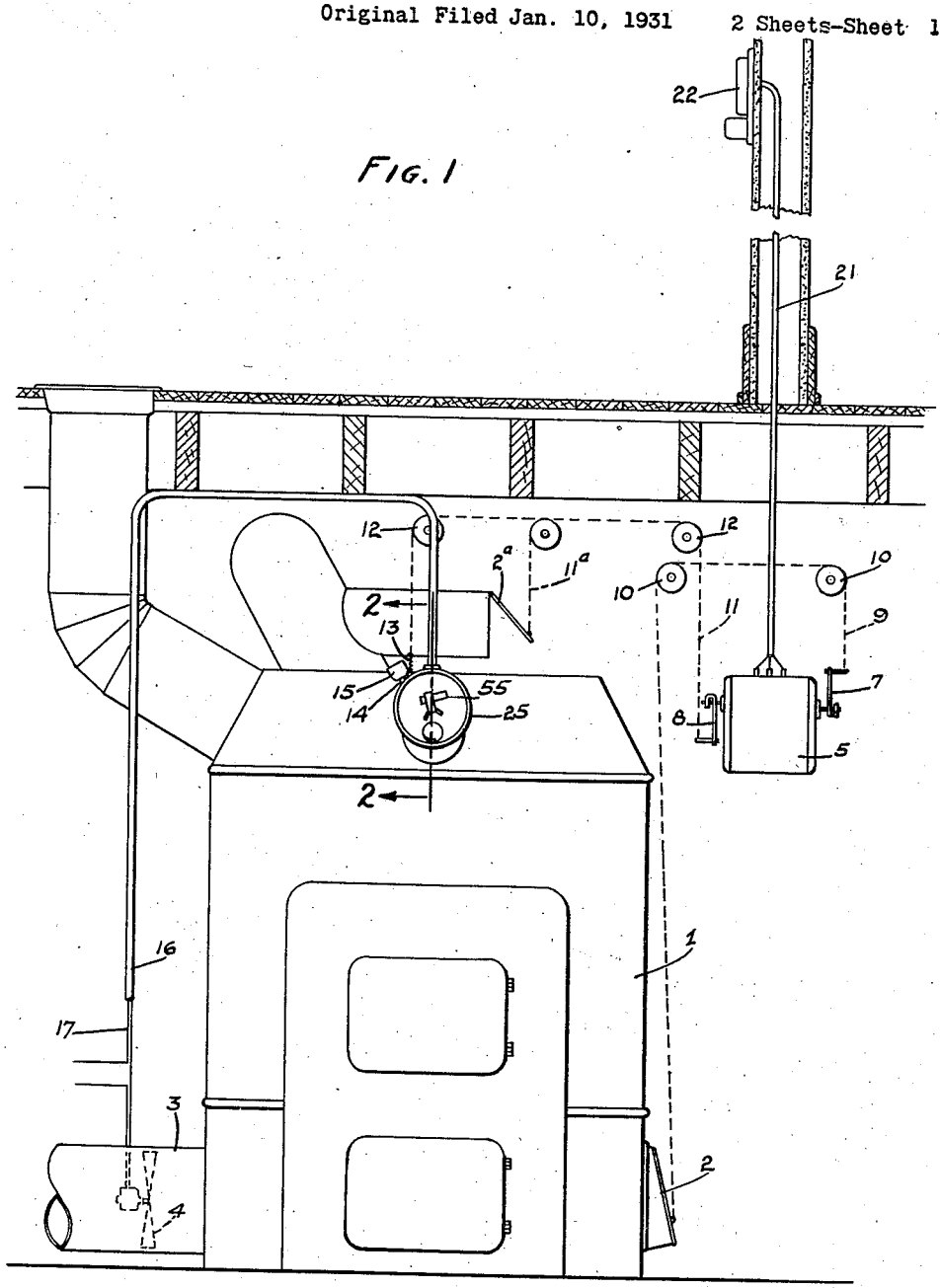

INVENTOR
DANIEL G. TAYLOR
By Paul, Paul Mfrany
ATTORNEYS

Patented Aug. 21, 1934

1,970,988

UNITED STATES PATENT OFFICE 1,970,988

TEMPERATURE CONTROL SYSTEM

Daniel G. Taylor, Minneapolis, Minn., assignor to Minneapolis-Honeywell Regulator Company, Minneapolis, Minn., a corporation of Delaware Original application January 10, 1931, Serial No. 507,863. Divided and this application April 11, 1932, Serial No. 604,491

24 Claims. (Cl. 236—11)

This invention relates generally to improvements in temperature control apparatus, is particularly concerned with a system of control for a hot air furnace, and is divisional of my co-pending application for Temperature control apparatus, Serial Number 507,863, filed January 10, 1931.

Features of the invention include: the direct adjustment of forced circulation-controlling means, coordinately with combustion-rate-varying means, and/or in response to varying temperature of air delivered by the furnace; the concurrent control of the furnace draft and air-circulation-forcing means in response to temperature variation in the room; the direct adjustment of the thermostatically controlled circulation-forcing means and/or direct mechanical adjustment of that means; the adjustment concurrently with the combustion-rate-varying means, or only in response to the varying temperature of air delivered by the furnace.

Objects, features and advantages of the invention will be set forth in the description of the drawings forming part of this application, and in said drawings Figure 1 is a view illustrating the system, the parts being positioned as when the fan switch is mechanically locked in open position against thermostatic control, and with the furnace draft doors closed;

Figure 3:
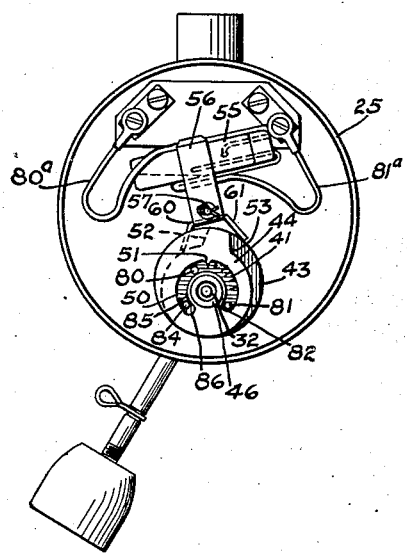
Figure 3 is a front view with the parts positionally corresponding to those of Figure 2.
Figure 4:
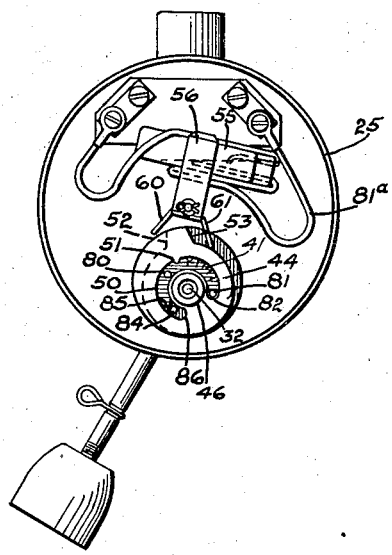
Figure 4 is a face view showing the high temperature position of the disks, with the switch closed.

In the drawings, numeral 1 indicates a hot air furnace; numeral 2 the ash pit draft door; and numeral 3 the cold air return pipe. A booster fan for forcing circulation of air in the pipe 3 is indicated at 4. Numeral 5 indicates what is known as a "program" motor, which controls the draft doors, and also effects an adjustment of a selectively adjustable thermostatically controlled means, to only permit closure of a control switch for the forced curculation producing means when the furnace is supplying sufficient heat. This motor is electrically controlled by a room thermostat 22 by means of suitable conductors passing through conduit 21. This circuit is well known.

When the thermostat calls for heat, the motor is energized, the arms 7 and 8 are rotated through an angle of 180 degrees and then the motor automatically stops. On a call for less heat by the room thermostat, the motor is again energized, the arms complete another 180 degrees of rotation in the same direction and again assume the position shown in the drawings. This type of motor is well known and, therefore, its detailed construction is neither illustrated nor described. The arm 8 is attached by a suitable flexible element 11 passing over pulleys 12, to a spring 13 which forms a yieldable connection between the chain and the thermostat adjusting element 14. This element is weighted as at 15 and when released from its position shown in Figure 1, moves by gravity to the position shown in Figure 3. The element 14 is, therefore, drawn to the position shown in Figure 1 against the action of the weight 15.

The means for controlling the circulation forcing means in response to the temperature of the air of the furnace before delivery includes switch 55, and its electrical connections, carried in the conduit 16 and generally indicated at 17.

Figure 5:
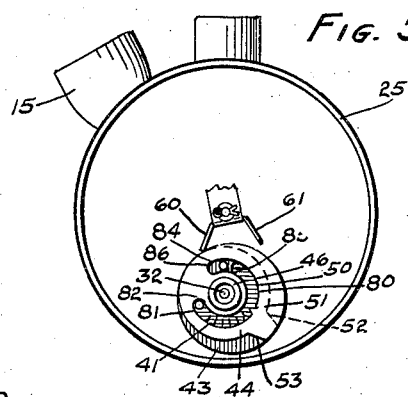
Figure 5 is a face view with the parts positioned in correspondence to Figure 1 with the switch mechanically locked in open position and with the disk cams so positioned as to prevent switch movement by thermostatic action.

The object is to prevent operation of the fan 4 when the furnace is not supplying heat, and conversely to operate the fan as soon as the furnace is producing the proper amount of heat. The arm 7 is connected with the draft door 2 by a suitable chain 9 passing over rollers 10, and the arm 8 is not only connected with the arm 14, but is connected by chain 11ᵃ with draft door 2ᵃ. The arrangement is such that when the door 2 is opened, door 2ᵃ is closed and vice versa. The draft doors may be considered broadly as any suitable means for varying rate of combustion in the furnace. The arms 7 and 8 are diametrically related. The result is that on rotation through an arc of 180 degrees from the position shown in Figure 1, draft door 2 is opened, element 14 is released to be lowered by weight 15 to the position shown in Figure 3, and, as herein designed, the parts are thus conditioned for thermostatic switch closure on sufficient temperature rise at the furnace, in this instance in the bonnet. With the parts positioned as shown in Figure 1, the switch is mechanically locked in open position, see Figure 5, against change to another control position by thermostatic action.

The means for controlling the circulation-forcing means in response to the temperature of the air before delivery by the furnace is illustrated in detail in Figures 2 to 7. A suitable housing is indicated at 25 and is provided with a tubular bearing extension 26 suitably secured as at 27 to the housing. A tubular support is journaled in an outer reduced portion of the bearing extension, and has one end journaled in an opening 30 of the housing and extends into the housing. The opposite end extends beyond the bearing extension. Journaled within the tubular support 29 is a rod 32 which projects therebeyond and into the housing and has its opposite end projecting beyond the opposite end of the tubular support. A coiled thermostatic element 34 has one end connected as at 36 to the element 29 and the opposite end connected at 37 to the rod. The thermostatic element is thus carried by the support 29 and is adapted to rotate the rod in either direction conformably to temperature change. A dial disk 40 is suitably secured to the end of the rod 32 within the housing and has graduations 41.

The instrument is properly calibrated by submitting the thermostat to some predetermined temperature, say 100 degrees F. and then rotating the disk 40 to register one of its graduations with an imaginary vertical line drawn through the axis of the rod and then fixing the disk to the shaft for rotation therewith.

Figure 2:
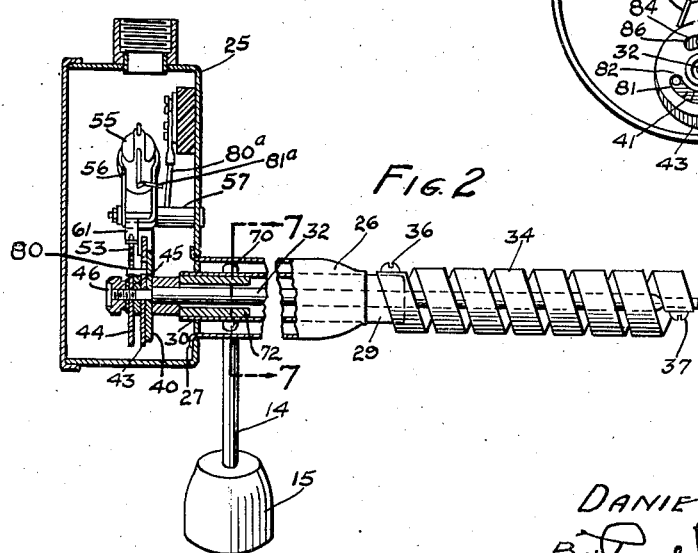
Figure 2 is a vertical longitudinal section through the thermostatically controlled switch device taken substantially on line 2—2 of Figure 1, with the device conditioned for control in response to temperature variations, to close the switch when furnace temperature is sufficiently high.
Figure 7:
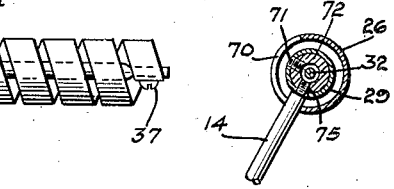
Figure 7 is a section on line 7—7 of Figure 2, illustrating the selectively adjustable thermostatic means for moving the disks to a position whereat the switch is mechanically locked in closed position, against change of position by thermostatic action.

Rotatably arranged upon the rod are two cams 43—44. The cam 43 abuts the face of dial 40. The cams have the form of stamped disks and are substantially identical in configuration but are placed on the shaft in reverse position as shown. A spacing collar 45 separates the cams as best shown in Figure 2, and a clamping thumb nut 46 in threaded engagement with the rod is adapted to clamp the disks (after adjustment) for motion with the rod. Each cam is provided with an arcuate slot 50 having a pointer 51 extending inwardly from its outer periphery. Through these slots, which are in register, the dial graduations can be observed. Each slot is, of course, concentric with the axis of rotation of the rod. Each cam is also provided with a shoulder. The shoulder of the cam 43 is indicated by the numeral 52, and the shoulder of the cam 44 is indicated by the numeral 53. These shoulders are faced in opposite directions for a purpose presently to be described.

Figure 6:
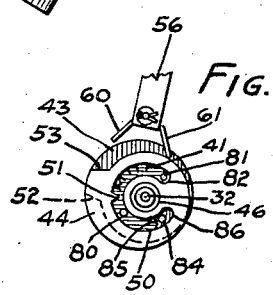
Figure 6 is a fragmentary face view showing the positions of the disks as during a heat over-run, from the position shown in Figure 4.

A mercury switch of the usual type is indicated at 55, and this switch is mounted on a support 56. Means pivoting the support to the housing is indicated at 57, and the axis of this means is parallel with the rod axis. The support is disposed over and spaced from the periphery of the cams and the axis of the pivot support lies in a vertical line passing through the axis of the rod 32. The support has extensions respectively indicated at 60—61 and respectively engageable by shoulders 52—53, and by the peripheral surfaces of cams 43—44. Ordinarily the shoulders are arranged in overlapping position as shown in Figure 3. The extensions are divergent toward the cams, and may be said to straddle them. The tube support and extensions are symmetrically balanced with reference to a vertical line drawn through the axes of rod and pivot means 57, so that "over-the-center" action by gravity may be obtained. A radial shoulder may be said to face toward the inner surface of the corresponding extension, that is toward those surfaces of the extensions which are nearest one another. The shoulders may be considered as tangent to a circle of less diameter than the diameter of a cam disk. The cam periphery between the shoulders is substantially spiral, and it will be noted that the cam extensions and cam peripheries are so related that after engagement of either shoulder with its extension and after the support is tipped there is no binding action between the parts. Thus, during engagement of either shoulder with its extension, the tube support is tilted to a gravity-maintained position, and thus whatever the degree and direction of motion of the shaft, no binding action between the extensions and cams can occur. The contact may be said to be gravity-maintained, only between the terminal of one of the extensions and the corresponding cam surface. Referring to Figure 6 (in which an over-run of the thermostat is represented) it is seen that the terminal of the arm 61 rests upon the periphery of the cam 44, while the terminal of the extension 60 is slightly spaced from the periphery of the cam 43. The tube rocks only through a limited fixed angle irrespective of the degree of temperature variations or degree of rotative motion of the cams. Therefore, the flexible leads 80ª—81ª are not put under strain which would tend to change the calibration of the instrument.

An important feature is the selective adjustment of the support 29, and the disks thereon relative to the switch support and arms 60—61 thereof. It will be noted that the thermostatic support 29 and thermostat can he bodily rotated with reference to these extensions without changing the position of the cams relative to one another.

One means for accomplishing this result (see Figure 7) is by providing an arcuate slot 70 in the tubular bearing extension 26, and providing a plurality of angularly related radially disposed threaded openings, in this instance two openings respectively designated 71—75, in the tubular support 29. These openings extend into a plug 72 secured in the rod support 29. The rod 14 has a weight 15 at the lower end, and is selectively connectable with either of these openings. A larger number of openings may be provided. When the rod is in the opening 75, the cams assume the position shown in Figure 3, and are conditioned to permit switch-closing operation as the result of thermostatically initiated rod motion. When the rod is positioned to engage the upper end of the arcuate slot 70 as in Figure 5, no thermostatically initiated switch-closing operation can occur. If the rod 14 is disconnected from the opening 75 and connected with the opening 71 and if, then, the rod is caused to assume the position shown in Figure 7, the cams will assume approximately the position shown in Figure 6, and the switch will be locked in closed position, so that no thermostatically initiated rod motion is great enough to cause shoulder 53 to engage extension 61. Figure 6 may represent positions corresponding either to a heat over-run from the position shown in Figure 4, or to a mechanical lock-out obtained by connecting the rod 14 with the opening 71 and moving it to the position shown in Figure 7.

The means 14 connected to the rod support, is adapted to rotate it either to prevent or permit switch operation as the result of thermostatically initiated rod motion, and means 11 connects 14 with 8 for causing rotative adjustment of the rod to prevent a thermostatically initiated switch-closing motion when the draft control is in draft-closed condition, and vice versa. It is evident that with the element 14 in a raised position, the cams are so positioned (see Figure 5) that thermostatic action upon these cams cannot close the switch. On the other hand, it is evident that when the element 8 rotates from its position in Figure 1, 14 is lowered, the rod support is swung and assumes the position shown in Figure 3, wherein the cams are so positioned that the switch may be closed when the disks rotate sufficiently in counter-clockwise direction, under the heating action of the furnace. However, it will be noted that when the parts are positioned as shown in Figure 3, the door 2 will be open because the arms 7 will also have moved through an arc of 180°.

Means has, therefore, herein been devised by which, through a mechanical connection, thermostatic switch operation is controlled by a damper-operating motor (or damper) so that the fan can be shut off irrespective of temperature of the furnace when the house is sufficiently warm, and means has also been provided so that in the summertime when the furnace is not operating, the fan can be made to operate at all times irrespective of temperature condition in either the furnace or in the house.

It is to be noted that the starting of the fan usually causes a drop of from 15° to 30° in furnace temperature and for the proper operation the cam setting should be wide enough so that the first drop in temperature will not cause immediate stopping of the fan by tilting the mercury tube. Otherwise the fan would be started and stopped rapidly. If, while the fan is operated, the room thermostat calls for less heat, the damper motor closes, the damper lifts the lever 14 and thereby changes the calibration of the thermostatic switch to such degree that the current to the fan is immediately cut off. This is accomplished by turning the thermostat and disk support through an angle of approximately 90°.

Means is provided for limiting the rotative adjustment of the disks 43—44 relative to one another to prevent such a degree of overlap of the shoulders 52—53 as would cause them to assume an inoperative relation with the extensions 60—61. To this end, the dial 40 is provided with two stop pins substantially diametrically related and respectively indicated 80—81. These pins loosely traverse the slots 50 of both disks 43 and 44. The pin 81 and the end 82 of the slot 50 of the disk 44 cooperate to limit adjusting motion of the disk 44 in counter-clockwise direction. Disk 43 is provided with a stop pin 84 which is disposed immediately adjacent the end 85 of the slot 50 of that disk, which pin traverses the slot 50 of the disk 44. This pin 84 and the end 86 of the slot 50 of the disk 44 cooperate to limit counter-clockwise motion of the disk 43, when the pin 81 is engaged with the end 82 of that slot. Pin 80 and the end 85 of slot 50 of disk 43 cooperate to limit clockwise motion of the disk 43, and when 80 and 85 are engaged the pin 84 limits clockwise motion of the disk 44 by engagement of the end 86 of the slot therewith. It will, of course, be understood that these pins may be arranged differently in different installations, and are only for the purpose of limiting disk rotation within the range of the particular design.

I claim as my invention:

1. In a control system for a hot air furnace, means for varying the rate of combustion in the furnace, means for forcing circulation of air heated by the furnace, means controlled by the furnace temperature for controlling the circulation-forcing means, including means adjustable to either permit or prevent operation of the circulation-forcing means, and means by which said adjustable means is adjusted coordinately with the combustion-rate-varying means and/or in response to varying temperature of the air delivered by the furnace.

2. In a control system for a hot air furnace, a room thermostat, means for varying the rate of combustion in the furnace, means for forcing circulation of the air heated by the furnace, means for controlling said circulation-forcing means in response to the temperature of the air before delivery by the furnace, including a switch, means adjustable respectively to permit and prevent thermostatic control of the switch, and means controlled by the room thermostat for adjusting said adjustable means to permit thermostatic control and concurrently operating said combustion rate-varying means to increase the combustion rate, and vice versa.

3. In a control system for a hot air furnace, a room thermostat, means for varying the rate of combustion in the furnace, means for forcing circulation of the air heated by the furnace, means for controlling said circulation-forcing means in response to the temperature of the air before delivery by the furnace, including a switch, means selectively adjustable respectively to permit and prevent thermostatic control of the switch, and to mechanically secure the switch in either control position, and means controlled by the room thermostat for adjusting said adjustable means, and concurrently and correspondingly controlling said combustion rate-varying means conformably to temperature variations in the room.

4. A hot air furnace including, a heat delivery line, and draft control means, a fan adapted to increase circulation in the heat delivery line, a circuit for said fan, means responsive to temperature at the furnace and adapted to control a fan circuit including a switch, and means movable independently of the switch and adapted respectively to condition the switch for thermostatic control and against thermostatic control, and means for controlling the adjustment of said support, and concurrently controlling the draft control means.

5. A hot air furnace including a heat delivery line and draft control means, a fan adapted to increase the circulation in the heat delivery line, a circuit for said fan, means responsive to temperature at the furnace and adapted to control the fan circuit, including a switch and means adjustable to condition the switch for thermal control or to secure it in either switch control position against thermal control, and means by which the draft control means and adjustable means are concurrently controlled.

6. In a control system for a hot air furnace, a space to be heated, means for varying the rate of combustion in the furnace, means for forcing circulation of air heated by the furnace, means responsive to the temperature of furnace air before delivery, for controlling said circulation-forcing means including a switch and a support, means by which the position of said support can be selectively adjusted to condition it for thermostatic control of said forced circulation-producing means or secure it at either of two control positions respectively to prevent or permit such thermostatic control, and means controlled by variations in the temperature of the space for concurrently controlling said support-adjusting means and said combustion rate-varying means.

7. In a control system for a hot air furnace, means for varying the rate of combustion in the furnace, means for forcing circulation of air heated by the furnace, means controlled by furnace temperature for controlling said circulation-forcing means, including a switch and a support, means by which the position of said support can be selectively adjusted to respectively permit and prevent operation of the switch, and means for concurrently controlling said support-adjusting means and said combustion rate varying means.

8. A control system for a hot air furnace comprising a furnace, means for forcing circulation of air heated by the furnace, means for controlling the rate of combustion in the furnace, adjustable means thermostatically controlled by furnace temperature for controlling said circulation-forcing means, and means for adjusting said adjustable means, and concurrently operating said combustion rate-controlling means.

9. In combination with a hot air furnace, means for forcing the circulation of air heated by the furnace, thermally controlled means responsive to the temperature of furnace air before delivery and adapted to control said circulation-forcing means, and adjustable respectively to respond or not respond thermostatically, means for controlling the combustion rate of the furnace, and means by which said adjustable means and combustion rate-controlling means are cooperatively controlled in response to temperature changes at the delivery point of air heated by the furnace.

10. In combination with a hot air furnace, means for forcing the circulation of air heated by the furnace, thermally controlled means responsive to the temperature of furnace air before delivery and adapted to control said circulation-forcing means, and adjustable respectively to respond, or not respond, thermostatically, means for controlling the combustion rate of the furnace, means by which said adjustable means and combustion rate-controlling means are cooperatively controlled, a thermostat responsive to temperature changes at the delivery point of air heated by the furnace, and means by which the thermostat controls the last mentioned means.

11. In combination with a hot air furnace, means for forcing the circulation of air heated by the furnace, and a switch for controlling said means, thermally controlled means responsive to the temperature of furnace air before delivery and adjustable respectively to lock the switch in either of its control positions, or to condition the switch for thermostatic control, means for controlling the combustion rate of the furnace, means by which said adjustable means and combustion rate-controlling means are cooperatively controlled, a thermostat responsive to temperature changes at the delivery point of air heated by the furnace, and means by which the thermostat controls the last mentioned means.

12. In combination with a hot air furnace, means for forcing the circulation of air in the furnace air delivery line, thermally controlled means responsive to the temperature of furnace air before delivery and adapted to control said circulation-forcing means, means by which said last mentioned means can be adjusted respectively to respond or not respond thermostatically, means for controlling combustion rate of the furnace, and means by which said adjusting means is controlled in response to temperature changes at the delivery point of the forced air.

13. In a control system for a hot air furnace, means for varying the rate of combustion in the furnace, means for forcing circulation of air heated by the furnace including a switch, a rotatable support having thermostatic means for rotating it in response to the temperature of the air before delivery by the furnace, said support and said switch having means cooperable to operate the switch as the result of rotation of the support, a rod detachably connected with the support for rotating it and adapted to be selectively connected to the support in different angular relations thereto, and means by which said rod is alternately moved in opposite directions coordinately with said combustion-rate-varying means.

14. In combination a hot air furnace having draft control means, a fan for increasing the hot air circulation in the hot air delivery line, thermostatically controlled means for controlling the draft control means to open it on a call for heat and close it after the heat call is satisfied, a rotatable support, a rod journaled on the support, a thermostatic element exposed to furnace temperature and movable with said support and rod, and adapted to reversely rotate the rod conformably to temperature changes, a switch, electrical connections between the switch and the fan, means upon the rod for operating the switch to close it when the temperature rises and to open it when the temperature falls, means connected to the support to obtain a rotative adjustment thereof either to prevent or permit switching action as a result of thermostatically initiated rod motion, and means for causing rotative adjustment of the rod to prevent a thermostatically initiated switch closing action, when the draft control means is in draft-closed condition, and vice versa.

15. In a control system for a heating device for heating a circulating fluid medium, in combination, means for varying the supply of heat to the fluid medium, means for circulating the fluid medium, thermostatically controlled means responsive to the temperature of the fluid medium for controlling said circulating means, thermostatically controlled means responsive to a condition other than the circulating fluid medium for controlling the heat supply varying means and means controlled by the heat supply varying means for conditioning said thermostatically controlled means to operate the circulating means when the heat supply varying means is operating to supply more than a minimum amount of heat to the fluid medium and when the fluid medium is at or above a predetermined temperature.

16. In a control system for a heating device for heating a circulating fluid medium, in combination, means for varying the supply of heat to the fluid medium, means for circulating the fluid medium, thermostatically controlled means responsive to the temperature of the fluid medium for controlling said circulating means, thermostatically controlled means responsive to a condition other than the circulating medium for controlling the heat supply varying means and means controlled by the heat supply varying means for adjusting said thermostatically controlled means to render the same operable to operate the circulating means when the heat supply varying means is supplying more than a minimum amount of heat to the fluid medium and the fluid medium is at or above a predetermined temperature.

17. In a control system for a heating device for heating a circulating fluid medium, in combination, means for varying the supply of heat to the fluid medium, a thermostat in the space to be heated in control of said heat supply varying means, means in control of the circulation of the fluid medium, thermostatically controlled means conditioned for operation by said heat supply varying means when the same is operated by the space temperature thermostat to supply more heat to the fluid medium, and connections between the thermostatically controlled means and circulation control means whereby the latter is operated by the former when the former has been conditioned for operation and the fluid medium is at or above a predetermined temperature.

18. In a control system for a heater for heating a fluid medium, in combination, means for varying the rate of combustion in the heater, circulating means for circulating the fluid medium, thermal means responsive to the temperature of the circulating medium, and means mechanically controlled by the combustion rate-varying means and thermal means for operating the circulating means.

19. In a control system for a heater for heating a fluid medium, in combination, means for varying the rate of combustion in the heater, circulating means for circulating the fluid medium, thermal means responsive to the temperature of the circulating medium, means controlled by the combustion rate-varying means and thermal means for operating the circulating means when the fluid medium is at or above a predetermined temperature and the combustion rate-varying means is operating to increase combustion, and a thermostat responsive to the temperature of the space to be heated in control of said combustion rate-varying means for operating the same to increase combustion when the space temperature falls below a predetermined minimum.

20. In a control system for a heater and a circulating fluid medium heated thereby, in combination, means for varying the rate of combustion in the heater, an electrically operated circulator for circulating the fluid medium, a circuit for said electrically operated circulator, thermal means responsive to the temperature of the fluid medium, and switching means mechanically controlled by the combustion rate-varying means and said thermal means for completing the circuit for the electrically operated circulator when the fluid medium is at or above a predetermined temperature and the combustion rate-varying means is operating to increase combustion.

21. In a control system for a heater and a circulating fluid medium heated thereby, in combination, means for varying the rate of combustion in the heater, an electrically operated circulator for circulating the fluid medium, a circuit for said electrically operated circulator, thermal means responsive to the temperature of the fluid medium, switching means controlled by the combustion rate varying means and said thermal means for completing the circuit for the electrically operated circulator when the fluid medium is at or above a predetermined temperature and the combustion rate-varying means is operating to increase combustion, and a thermostat responsive to the temperature of a space to be heated for operating said combustion rate-varying means to increase combustion when the space temperature falls below a predetermined minimum.

22. In a control system for a heater and a circulating fluid medium heated thereby, in combination, means for varying the rate of combustion in the heater, an electrically operated circulator for circulating the fluid medium, a switch in circuit with said electrically operated circulator, thermal means responsive to the temperature of the fluid medium, and means controlled by the combustion rate-varying means and said thermal means for operating said switch to closed circuit position when the combustion rate-varying means is operating to increase combustion and the fluid medium is at or above a predetermined temperature.

23. In a control system for a heater and a circulating fluid medium heated thereby, in combination, means for varying the rate of combustion in the heater, an electrically operated circulator for circulating the fluid medium, a switch in circuit with said electrically operated circulator, thermal means responsive to the temperature of the fluid medium, means controlled by the combustion rate-varying means and said thermal means for operating said switch to closed circuit position when the combustion rate-varying means is operating to increase combustion and the fluid medium is at or above a predetermined temperature, and a space temperature responsive thermostat in control of the combustion rate-varying means.

24. In a control system for a heater for heating a circulating fluid medium and provided with a draft damper, in combination, a room thermostat, a damper motor controlled thereby, an electrically operated circulator for circulating the fluid medium, a thermostatic switch responsive to the temperature of the fluid medium, a circuit for the electrically operated circulator including said switch, and connections between the heater draft damper, the damper motor and thermostatic switch whereby the thermostatic switch is conditioned to complete the circuit to the electrically operated circulator when the fluid medium temperature is at a predetermined point and the draft damper is open to increase combustion in the heater.

DANIEL G. TAYLOR.